US010607172B2

(12) United States Patent
Ayyagari et al.

(10) Patent No.: US 10,607,172 B2
(45) Date of Patent: Mar. 31, 2020

(54) SMART AND SELF DRIVING TROLLY MANAGEMENT

(71) Applicant: International Business Machines Corporation, Armonk, NY (US)

(72) Inventors: Phani Kumar V. U. Ayyagari, Hyderabad (IN); Manish Bhide, Serilingampally (IN); Madan K. Chukka, Hyderabad (IN); Purna Chandra Jasti, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 15/863,518

(22) Filed: Jan. 5, 2018

(65) Prior Publication Data

US 2019/0213515 A1 Jul. 11, 2019

(51) Int. Cl.
*G06Q 10/06* (2012.01)
*G05D 1/02* (2020.01)

(52) U.S. Cl.
CPC ....... *G06Q 10/06315* (2013.01); *G05D 1/021* (2013.01); *B62B 2202/24* (2013.01)

(58) Field of Classification Search
USPC .......................................................... 701/24
See application file for complete search history.

(56) References Cited

U.S. PATENT DOCUMENTS

| 2010/0129184 | A1* | 5/2010 | Thogersen | ................ B64F 1/32 414/467 |
| 2016/0080913 | A1 | 3/2016 | Thogersen | |
| 2016/0244184 | A1* | 8/2016 | Alderman | ............... B64F 1/368 |
| 2016/0260161 | A1 | 9/2016 | Atchley et al. | |
| 2017/0003682 | A1* | 1/2017 | Segman | ............... G05D 1/0295 |

FOREIGN PATENT DOCUMENTS

CN 106741028 A 5/2017

* cited by examiner

*Primary Examiner* — Tyler D Paige
(74) *Attorney, Agent, or Firm* — North Shore Patents, P.C.; Joseph L. Acayan

(57) ABSTRACT

Embodiments generally relate an intelligent automated trolley system. In some embodiments, a method includes receiving a trolley request. The method further includes determining one or more luggage characteristics of one or more luggage items. The method further includes determining one or more trolleys to send based on the luggage characteristics of the one or more luggage items. The method further includes assigning the one or more trolleys to assist the user based on the one or more characteristics of the one or more luggage items. The method further includes sending the one or more trolleys to a meeting location.

20 Claims, 4 Drawing Sheets

SMART AND SELF DRIVING TROLLY MANAGEMENT

BACKGROUND

International travel is increasing due to multinational companies expanding their businesses. During such travels, it is quite common for a traveler to carry a large amount of luggage depending on the length time of the stay in the destination location. Travelers may look for a trolley upon entering an airport to assist in carrying the user's luggage. A conventional trolley has a frame of a sturdy material such as metal and wheels. The frame typically has a flat base upon which several pieces of luggage may be placed. The trolley may then be pushed and steered by a traveler while the trolley carries the luggage. Trolleys are typically nested with other trolleys at a trolley station. Trolley stations can be hard to find depending on their visibility and location in an airport.

SUMMARY

Disclosed herein are a method for implementing a trolley management system, and a system and computer program product as specified in the independent claims. Embodiments are given in the dependent claims. Embodiments can be freely combined with each other if they are not mutually exclusive.

Embodiments provide an intelligent automated trolley management system that assists travelers in airport or any location where trolleys are used. The intelligent trolley management system directly interacts with a user's vehicle and makes smart decisions to assist the user in obtaining a trolley for carrying luggage.

In an embodiment, a method includes receiving a trolley request. The method further includes determining one or more luggage characteristics of one or more luggage items. The method further includes determining one or more trolleys to send based on the characteristics of the one or more luggage items. The method further includes assigning the one or more trolleys to assist the user based on the one or more characteristics of the one or more luggage items. The method further includes sending the one or more trolleys to a meeting location.

In another aspect, the trolley request is to be generated by a smart trolley module associated with a vehicle system. In another aspect, the one or more luggage characteristics include luggage weight information and luggage volume information. In another aspect, the trolley request is generated by a smart trolley module associated with a mobile application on a mobile device. In another aspect, the method further includes determining one or more user characteristics of a user to be assisted. In another aspect, the one or more trolleys are self-driving trolleys. In another aspect, the method further includes providing a user with an option of sharing one or more trolleys between luggage items of multiple users.

DETAILED DESCRIPTION

Embodiments described herein provide an intelligent automated trolley management system that assists travelers in an airport or any location where trolleys are used. The intelligent trolley management system directly interacts with user's vehicle and makes smart decisions to assist the user in obtaining a trolley for carrying luggage. For example, embodiments assist users in requesting a trolley for luggage in an airport or in any location, and provide a trolley based on luggage and user characteristics.

In some embodiments, a system receives a trolley request. The system determines one or more luggage characteristics of one or more luggage items. The system determines one or more trolleys to send based on the characteristics of the one or more luggage items. The system then assigns the one or more trolleys to assist the user based on the one or more characteristics of the one or more luggage items. The system then sends the one or more trolleys to a meeting location.

Figure 1:
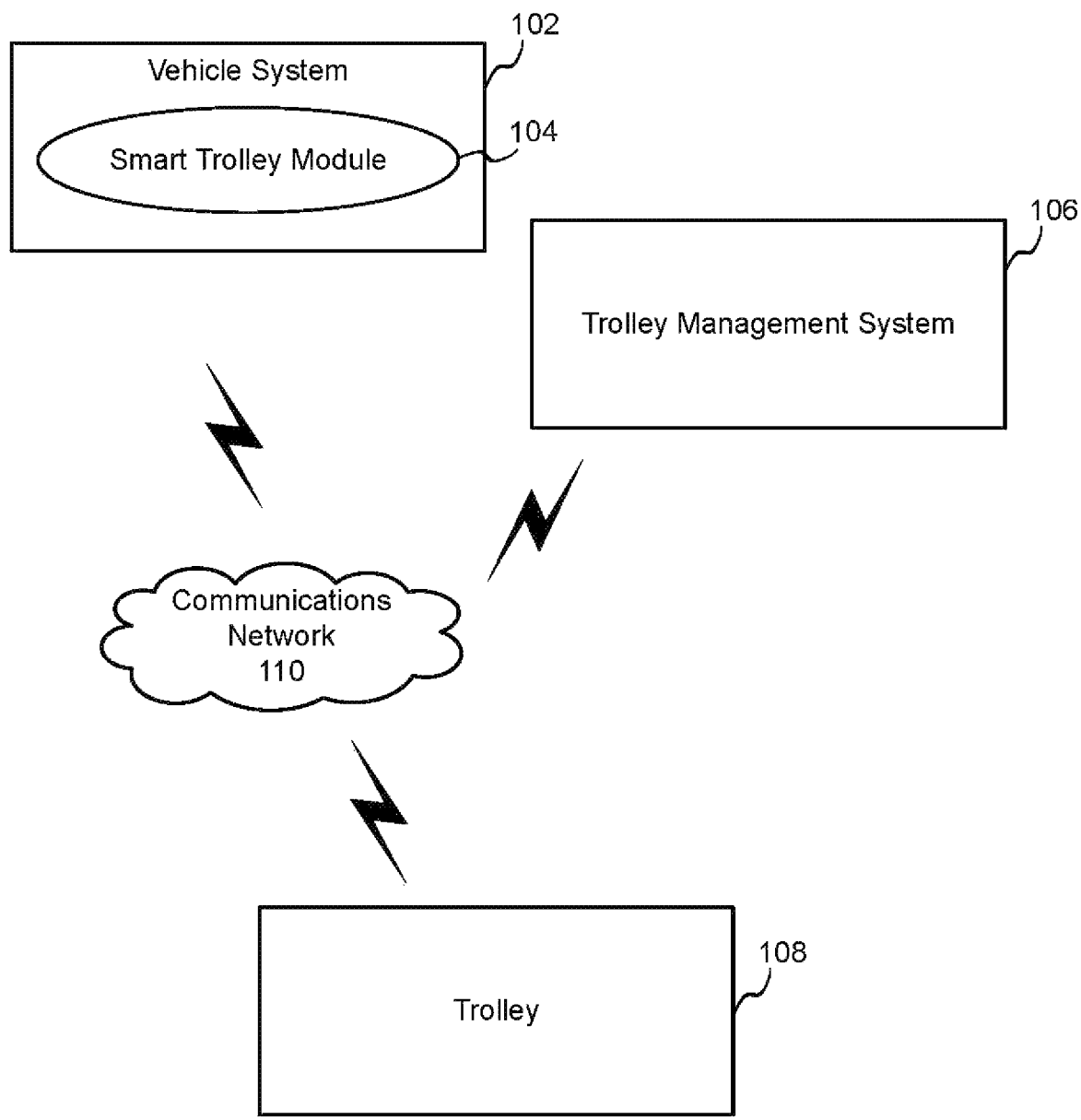
FIG. 1 is an example environment for implementing an intelligent automated trolley management system, according to some embodiments.

FIG. 1 is an example environment 100 for implementing an intelligent automated trolley management system, according to some embodiments. Shown is an automated vehicle system 102 that includes a smart trolley module 104. Also shown are a centralized trolley management system 106 and an automated trolley 108.

In various embodiments, the vehicle system 102 may be a vehicle that transports a user. For example, the vehicle system 102 may be a vehicle that is driven by the user, or may be a vehicle (e.g., taxi, shuttle, etc.) that is used to drive the user, etc.). As indicated herein, the vehicle system 102 includes the smart trolley module 104, which communicates with the trolley management system 106. The smart trolley module 104 of the vehicle system 102, the centralized trolley management system 106, and the trolley 108 may communicate with each other via a communications network 110. The communications network 110 may be any network such as a wireless local area network (WLAN), the Internet, or any combination thereof including other networks.

In various embodiments, the trolley management system 106 may be a system that is located at any transportation-related environment such as an airport, train station, bus station, etc., where trolleys are used to assist users in carrying luggage.

In various embodiments, the trolley 108 may be a trolley that carries luggage for a user. While some embodiments are described herein in the context of a trolley that transports luggage, in some embodiments, a given trolley may also transport users as well.

For ease of illustration, FIG. 1 shows one block for each of the vehicle system 102, the trolley management system 106, and the automated trolley 108. Blocks 102, 106, and 108 may each represent multiple such systems. For example, there may be tens or hundreds of vehicle systems taking travelers to a given airport using the trolley management system 106. Similarly, there may be tens or hundreds of trolleys at the airport available to transport luggage for travelers. In some embodiments, there may be multiple trolley management systems in a given airport (e.g., a large airport) located at different portions of the airport, where the trolley management systems coordinate with one another in order to provide trolley services to travelers. In other embodiments, environment 100 may not have all of the components shown and/or may have other elements including other types of elements instead of, or in addition to, those shown herein.

While the vehicle system 102, the trolley management system 106, and the automated trolley 108 perform embodiments described herein, in other embodiments, any suitable component or combination of components associated with the vehicle system 102, the trolley management system 106, and the automated trolley 108 or any suitable processor or processors associated with the vehicle system 102, the trolley management system 106, and the automated trolley 108 may facilitate performing the embodiments described herein. In various embodiments, the environment 100 may not have all of the components shown and/or may have other elements including other types of components instead of, or in addition to, those shown herein. For example, in some embodiments, each of the vehicle system 102, the trolley management system 106, and the automated trolley 108 may include a computer system that performs the embodiments described herein.

As described in more detail herein, embodiments provide an intelligent automated trolley management system that assists travelers in airports or any location where trolleys are used. The intelligent trolley management system directly interacts with a user's vehicle and makes smart decisions to assist the user in obtaining a trolley for carrying luggage.

Figure 2:
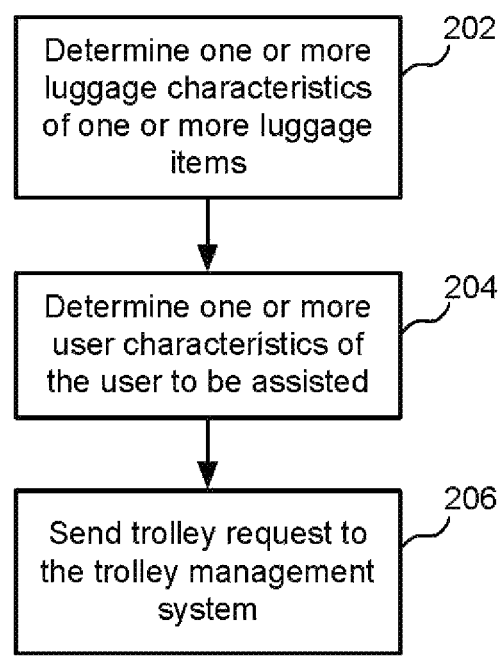
FIG. 2 is an example flow diagram for implementing an intelligent automated trolley system, according to some embodiments.

FIG. 2 is an example flow diagram for implementing an intelligent automated trolley system, according to some embodiments. Referring to both FIGS. 1 and 2, a method begins at block 202, where a system such as the smart trolley module 104 determines one or more luggage characteristics of one or more luggage items. For example, the luggage characteristics may include luggage weight information and luggage volume information. The volume of the luggage may include the size (e.g., dimensions) of each luggage item.

The smart trolley module 104 in the vehicle may calculate the approximate number of luggage items and the weight of the luggage items. The smart trolley module 104 may determine the number of luggage items and the weight of the luggage items using appropriate sensors. For example, a camera may be used to capture a photo of the luggage, and the smart trolley module 104 may analyze the photo to determine the number of luggage items. Also, a weighing device may weigh the luggage items to determine the weight of the individual luggage items and/or the total weight of the luggage items. In some embodiments, the smart trolley module 104 may display this information to the user so that the user can manually confirm or edit the values shown by the smart trolley module 104.

In various embodiments, a communication system in the vehicle system 102 invokes the smart trolley module 104 when the user selects the travel destination, such as an airport. The smart trolley module 104 may also be invoked manually by the user using a simple touch on a touch screen.

At block 204, the smart trolley module 104 determines one or more user characteristics of the user to be assisted. For example, in some embodiments, the user characteristic may include a physical condition, age, etc. Example embodiments directed to the user characteristics are described in more detail herein.

At block 206, the smart trolley module 104 sends the trolley request to the trolley management system 106. While some embodiments are described in the context of the smart trolley module 104 in association with a vehicle system, in other embodiments, the smart trolley module may also be implemented in association with a mobile application.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 3:
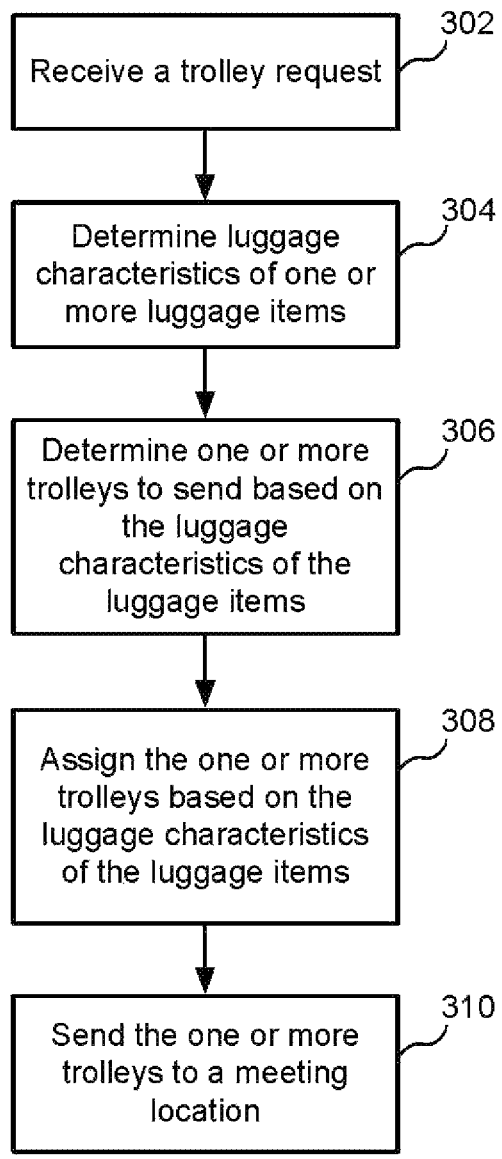
FIG. 3 is an example flow diagram for implementing an intelligent automated trolley system, according to some embodiments.

FIG. 3 is an example flow diagram for implementing an intelligent automated trolley system, according to some embodiments. Referring to both FIGS. 1 and 2, a method begins at block 302, where a system such as trolley management system 106 receives a trolley request. In some embodiments, the trolley request may be generated by smart trolley module 104 associated with the vehicle system 102. As indicated herein, while some embodiments of the smart trolley module 104 are described herein in the context of a vehicle system 102, a smart trolley module may also be implemented in association with a mobile application. For example, in some embodiments, the trolley request may be generated by a smart trolley module associated with a mobile application on a mobile device (e.g., smart phone).

At block 304, the trolley management system 106 determines one or more luggage characteristics of one or more luggage items. The luggage characteristics may be provided in the request received from the smart trolley module 104. As indicated herein, in some embodiments, the luggage characteristics may include luggage weight information and luggage volume information. The volume of the luggage may include the size (e.g., dimensions) of each luggage item.

In some embodiments, the trolley management system 106 may determine from the smart trolley module 104 one or more user characteristics of the user to be assisted. In some embodiments, at least one user characteristic includes a physical condition. In some embodiments, the trolley management system 106 may take into consideration the age or age range of users traveling. In some embodiments, the trolley management system 106 may determine information (e.g., age, health condition, etc.) of the user based on manual entry of the user information and/or user information provided by a pre-exiting user profile.

In case of senior citizens, the trolley management system 106 may assume that the user or users may not want to push a heavy trolley, and may order a small trolley, or may order a large trolley if the user is assisted by another person. In some embodiments, the trolley management system 106 may provide one or more trolleys that are self-driving trolleys. A self-driving trolley may be useful in a scenario where only senior citizens are traveling and there is no one accompanying them or in situations where a person is pushing a stroller or carrying a child, etc.

At block 306, the trolley management system 106 determines one or more trolleys to send based on the one or more luggage characteristics of the one or more luggage items. In some embodiments, the trolley management system 106 may determine one or more trolleys to send based also on the characteristics of the user or users.

Based on various factors such as the number of luggage items, the number of persons traveling, luggage weight, the smart trolley module 104 may automatically retrieve information from the trolley management system 106 about the trolleys and may inform the user that the trolley management system 106 is arranging for one or more trolleys to be available for use by the user.

The smart trolley module 104 may show in a graphical figure the arrangement of the luggage on the trolley. The graphical figure may be shown so that user can get an idea of how the user's luggage will be transported by the trolley. In some embodiments, the user may rearrange the luggage as desired.

Once the type of the trolley or trolleys are selected, the trolley management system 106 shows the user the fee to order trolleys. The user may agree to pay by any suitable means (e.g., by giving permission to access a digital wallet).

Once a payment is authorized, the trolley management system 106 may confirm the availability of the trolley or trolleys, or communicate options if the trolley management system 106 could not match particular requirements.

The smart trolley module 104 may aggregate all the relevant information and communicates the information to the centralized trolley management system 106 running in the airport.

At block 308, the trolley management system 106 assigns the one or more trolleys to assist the user based on the one or more characteristics of the one or more luggage items. In some embodiments, the trolley management system 106 also assigns one or more trolleys to assist the user based on the one or more characteristics of the user or users.

If trolley management system 106 confirms the availability, the smart trolley module 104 may send the current location of the vehicle or the location where vehicle is going to park in the airport.

At block 310, the trolley management system 106 automatically sends the one or more trolleys to a meeting location. In various embodiments, the trolley management system 106 takes the order or trolley request from the smart trolley module 104 and communicates information from the order to the trolley 108. Such information may include geographic location coordinates of the meeting location, an identity of the user, characteristics of the luggage items, etc. The trolley management system 106 may then direct the trolley 108 to the appropriate meeting location based on the geographic location coordinates. In some embodiments, the trolley management system 106 may determine the meeting location based on the current location of the luggage (e.g., if the luggage has arrived at the airport). This location may be included in the trolley request as indicated above. In some implementations, the trolley management system 106 may determine the meeting location based on a predicted location of the luggage and at a predicted time (e.g., if the luggage has not yet arrived at the airport). Such a predicted location may be determined between the smart trolley module 104 and trolley management system 106. For example, the smart trolley module 104 may indicate the specific arrival location. Based on the current location of the smart trolley module 104 while en route, and the speed of the vehicle system 102, the smart trolley module 104 and trolley management system 106 may estimate the arrival time at the destination location. The trolley management system 106 may direct the trolley to arrive at the destination location at the same time as the traveler or shortly before the traveler arrives at the destination. This would minimize idle time for trolleys in the event of a possible shortage of trolleys.

In some embodiments, the trolley 108 is equipped with a self-driving capability and a communication module. The trolley 108 may automatically travel to the location where the car is parked or the location where the traveler/car is about to arrive. In various embodiments, the trolley 108 may include a suitable navigation system such as a global positioning system (GPS) and a map system for navigation. As a result, upon arriving at the airport, the traveler does not need to spend time up carrying luggage around and searching for a trolley station. The trolley management system 106 automatically sends one or more trolleys to traveler. Also, because the traveler has already ordered a trolley, the trolley management system 106 ensures that one or more trolleys are immediately available for use upon the traveler's arrival.

In some embodiments, if the user sends luggage via a self-driving vehicle (autonomous vehicle), the self-driving vehicle may use tags such as radio frequency identification (RFID) tags to identify the luggage owner and inform the owner about the trolley 108.

In some embodiments, the trolley management system 106 may provide a user with an option of sharing one or more trolleys between luggage items of multiple users. This may be useful to one or more users if the trolley payment is expensive.

Embodiments described herein provide various benefits. For example, a user need not worry about manually picking a trolley and wasting time in doing research about trolleys specific to each airport. Furthermore, a user can order a trolley before the user arrives at the airport thereby saving time. Furthermore, the user experience is seamless from the point the user arrives at the airport to the point the user enters the airplane.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 4:
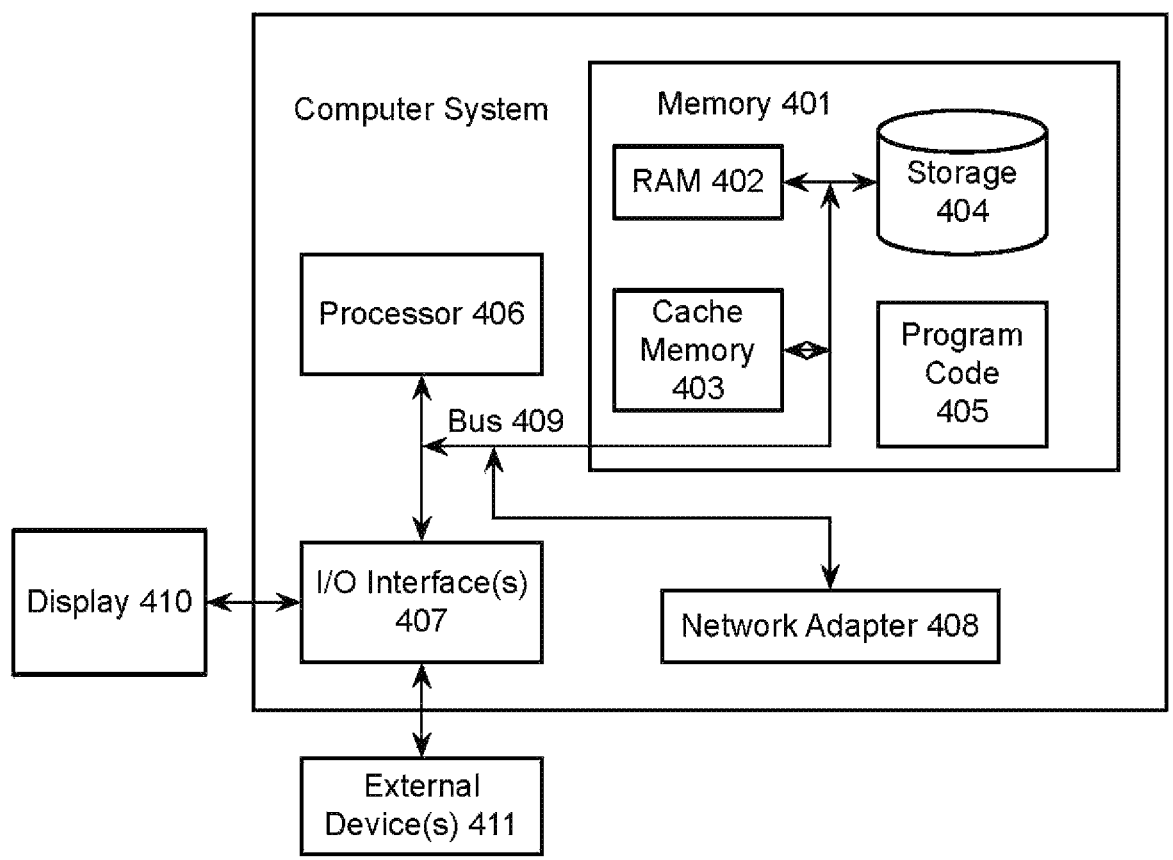
FIG. 4 is a block diagram of an example computer system, which may be used for embodiments described herein.

FIG. 4 is a block diagram of an example computer system 400, which may be used for embodiments described herein. In various embodiments, vehicle system 102, the trolley management system 106, and the trolley 108 may include a computer system such as computer system 400 according to embodiments of the present invention, as illustrated in FIG. 4. The computer system 400 is operationally coupled to one or more processing units such as processor 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or storage 404, which may include non-volatile storage media or other types of memory. The memory 401 may include at least one program product having a set of at least one program code module 405 that are configured to carry out the functions of embodiment of the present invention when executed by the processor 406. The computer system 400 may also communicate with a display 410 or one or more other external devices 411 via I/O interfaces 407. The computer system 400 may communicate with one or more networks, such as communications network 110, via network adapter 408. The vehicle system 102, the trolley management system 106, and the trolley 108 may each include many if not all of the components of the computer system 400.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for implementing an intelligent automated trolley system, the method comprising:
   receiving, by a computer, a trolley request from a mobile device of a user;
   determining, by the computer, one or more luggage characteristics of one or more luggage items based on the trolley request;
   determining, by the computer, one or more trolleys to send based on the luggage characteristics of the one or more luggage items;
   assigning, by the computer, the one or more trolleys to assist the user based on the one or more characteristics of the one or more luggage items;
   sending, by the computer, a meeting location to the one or more trolleys; and
   sending, by the computer, the one or more trolleys to the meeting location.

2. The method of claim 1, wherein the trolley request is generated by a smart trolley module associated with a vehicle system.

3. The method of claim 1, wherein the one or more luggage characteristics include luggage weight information and luggage volume information.

4. The method of claim 1, wherein the trolley request is generated by a smart trolley module associated with a mobile application on the mobile device.

5. The method of claim 1, further comprising determining one or more user characteristics of the user to be assisted.

6. The method of claim 1, wherein the one or more trolleys are self-driving trolleys.

7. The method of claim 1, further comprising providing the user with an option of sharing one or more trolleys between luggage items of multiple users.

8. A non-transitory computer program product for implementing an intelligent automated trolley system, the computer program product including at least one computer readable storage medium having program instructions embodied therewith, the program instructions executable by at least one processor to cause the at least one processor to perform operations comprising:
   receiving, by a computer, a trolley request from a mobile device of a user;
   determining, by the computer, one or more luggage characteristics of one or more luggage items based on the trolley request;
   determining, by the computer, one or more trolleys to send based on the luggage characteristics of the one or more luggage items;
   assigning, by the computer, the one or more trolleys to assist the user based on the one or more characteristics of the one or more luggage items;
   sending, by the computer, a meeting location to the one or more trolleys; and
   sending, by the computer, the one or more trolleys to the meeting location.

9. The computer program product of claim 8, wherein the trolley request is generated by a smart trolley module associated with a vehicle system.

10. The computer program product of claim 8, wherein the one or more luggage characteristics include luggage weight information and luggage volume information.

11. The computer program product of claim 8, wherein the trolley request is generated by a smart trolley module associated with a mobile application on the mobile device.

12. The computer program product of claim 8, wherein the at least one processor further performs operations comprising determining one or more user characteristics of the user to be assisted.

13. The computer program product of claim 8, wherein the one or more trolleys are self-driving trolleys.

14. The computer program product of claim 8, wherein the at least one processor further performs operations comprising providing the user with an option of sharing one or more trolleys between luggage items of multiple users.

15. A system comprising:
   comprising at least one processor and a non-transitory computer readable storage medium having program instructions embodied therewith, the program instructions executable by the first processor to cause the at least one processor to perform operations comprising:
   receiving, by a computer, a trolley request from a mobile device of a user;
   determining, by the computer, one or more luggage characteristics of one or more luggage items based on the trolley request;
   determining, by the computer, one or more trolleys to send based on the luggage characteristics of the one or more luggage items;
   assigning, by the computer, the one or more trolleys to assist the user based on the one or more characteristics of the one or more luggage items;
   sending, by the computer, a meeting location to the one or more trolleys; and
   sending, by the computer, the one or more trolleys to the meeting location.

16. The system of claim 15, wherein the trolley request is generated by a smart trolley module associated with a vehicle system.

17. The system of claim 15, wherein the one or more luggage characteristics include luggage weight information and luggage volume information.

18. The system of claim 15, wherein the trolley request is generated by a smart trolley module associated with a mobile application on the mobile device.

19. The system of claim 15, wherein the at least one processor further perform operations comprising determining one or more user characteristics of the user to be assisted.

20. The system of claim 15, wherein the one or more trolleys are self-driving trolleys.

* * * * *